(12) United States Patent
Pointner et al.

(10) Patent No.: US 12,188,825 B2
(45) Date of Patent: Jan. 7, 2025

(54) AIR-CORE INDUCTOR WITH TEMPERATURE MEASUREMENT SYSTEM

(71) Applicant: HSP HOCHSPANNUNGSGERÄTE GMBH, Troisdorf (DE)

(72) Inventors: Klaus Pointner, Linz (AT); Martin Haiden, Linz (AT)

(73) Assignee: HSP Hochspannungsgeräte GmbH, Troisdorf (DE)

( * ) Notice: Subject to any disclaimer, the term of this patent is extended or adjusted under 35 U.S.C. 154(b) by 105 days.

(21) Appl. No.: 17/787,640

(22) PCT Filed: Dec. 17, 2020

(86) PCT No.: PCT/EP2020/086764
§ 371 (c)(1),
(2) Date: Jun. 21, 2022

(87) PCT Pub. No.: WO2021/122989
PCT Pub. Date: Jun. 24, 2021

(65) Prior Publication Data
US 2022/0412805 A1    Dec. 29, 2022

(30) Foreign Application Priority Data
Dec. 19, 2019    (EP) .................................... 19217934

(51) Int. Cl.
*G01J 5/00* (2022.01)
*H02J 50/00* (2016.01)
(Continued)

(52) U.S. Cl.
CPC ........... *G01J 5/0096* (2013.01); *H02J 50/001* (2020.01); *H04N 5/33* (2013.01); *H04N 7/18* (2013.01); *G01J 2005/0077* (2013.01)

(58) Field of Classification Search
None
See application file for complete search history.

(56) References Cited

U.S. PATENT DOCUMENTS 9,336,942 B2    5/2016  Yamada et al.
10,120,021 B1   11/2018 Silva et al.
(Continued)

FOREIGN PATENT DOCUMENTS

| CN | 109142842 A | 1/2019 |
| CN | 110260969 A | 9/2019 |

(Continued)

OTHER PUBLICATIONS

Grilo, Antonio M. et al:, "An Integrated WSAN and SCADA System for Monitoring a Critical Infrastructure", IEEE Transactions on Industrial Informatics, vol. 10, No. 3, pp. 1755-1764, XP011555951, ISSN: 1551-3203, DOI: 10.1109/TII.2014.2322818; 2014.
(Continued)

*Primary Examiner* — James M Anderson, II
(74) *Attorney, Agent, or Firm* — Laurence A. Greenberg; Werner H. Stemer; Ralph E. Locher

(57) ABSTRACT

An air-core inductor with a temperature measurement system. The temperature measurement system uses a thermographic sensor, an energy harvesting device configured for obtaining electrical energy from the electromagnetic field and a transmitter configured for contactless data transmission arranged on the air-core inductor. The energy harvesting device may include a coil, a rectifier element, and a storage.

10 Claims, 1 Drawing Sheet

(51) Int. Cl.
*H04N 5/33* (2023.01)
*H04N 7/18* (2006.01)

(56) References Cited

U.S. PATENT DOCUMENTS

| | | | |
|---|---|---|---|
| 2009/0015239 A1 | 1/2009 | Georgiou et al. | |
| 2009/0115426 A1 | 5/2009 | Muench, Jr. et al. | |
| 2009/0278651 A1 | 11/2009 | Okada et al. | |
| 2010/0114392 A1* | 5/2010 | Lancaster | H02J 3/00 |
| | | | 700/297 |
| 2015/0287525 A1* | 10/2015 | Yamada | H01F 37/00 |
| | | | 336/105 |
| 2016/0294448 A1* | 10/2016 | Cano Rodriguez | H01F 27/24 |
| 2017/0199229 A1* | 7/2017 | King | H02J 13/00017 |
| 2018/0048187 A1 | 2/2018 | White et al. | |

FOREIGN PATENT DOCUMENTS

| | | | | |
|---|---|---|---|---|
| DE | 102014200032 A1 | 7/2015 | | |
| DE | 112013005274 T5 | 9/2015 | | |
| KR | 20100063549 A | 6/2010 | | |
| KR | 1979631 B1 * | 5/2019 | | G01K 1/08 |
| KR | 101979631 B1 | 5/2019 | | |
| WO | WO 2015080693 A1 | 6/2015 | | |

OTHER PUBLICATIONS

Moghe R. et al: "A robust smart sensor for smart substations", 2012 IEEE Power and Energy Society General Meeting, pp. 1-8, XP032465782, DOI: 10.1109/PESGM.2012.6345149, ISBN: 978-1-4673-2727-5; 2012.

* cited by examiner

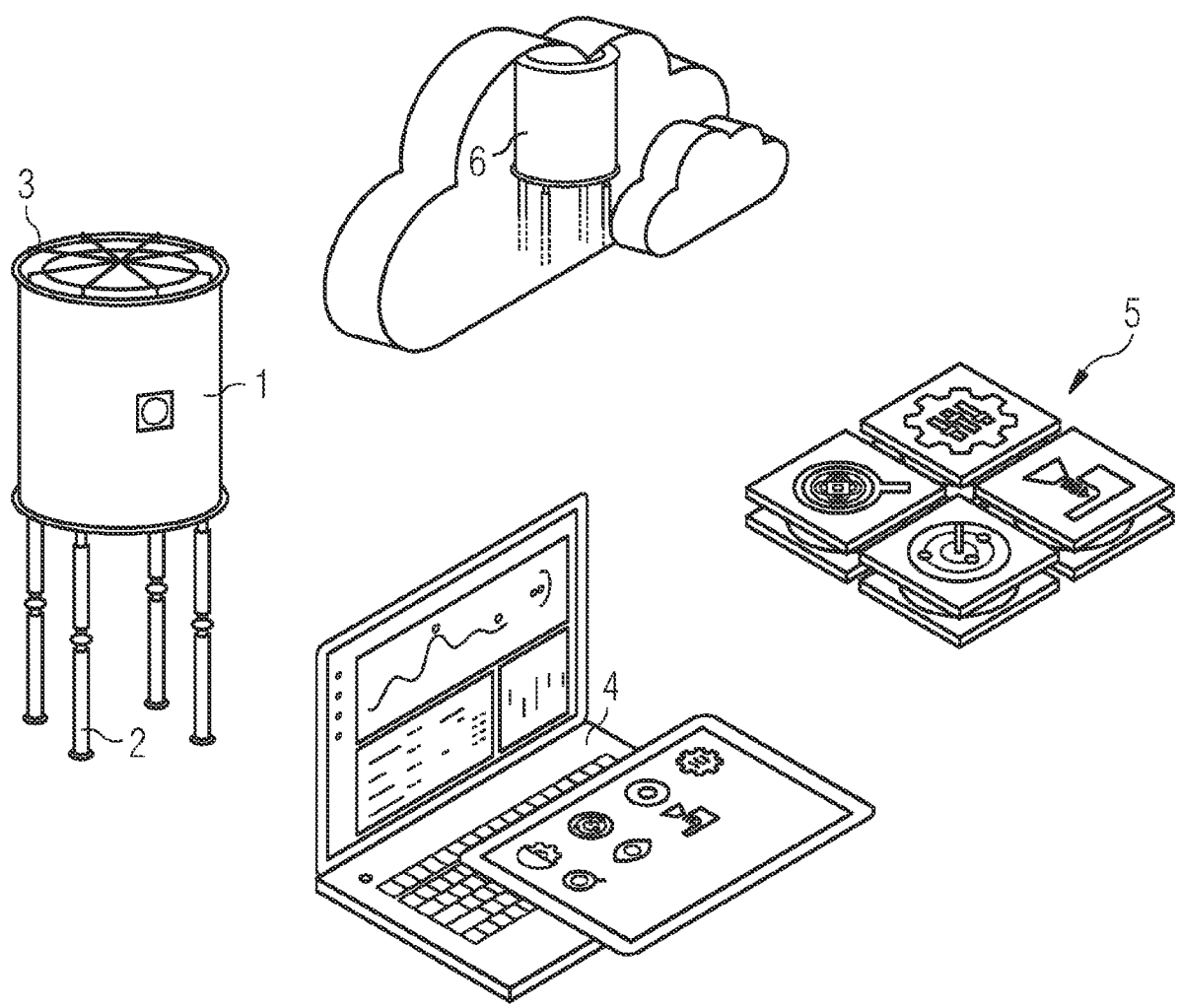

AIR-CORE INDUCTOR WITH TEMPERATURE MEASUREMENT SYSTEM

FIELD AND BACKGROUND OF THE INVENTION

Air-core inductors are used as smoothing inductor for example in high-voltage direct current (HVDC) transmission paths.

As essential elements of the electrical grid they can be monitored by means of SCADA systems in the context of grid control technology in order thus to assist the operator in the operational management of the grid, i.e. to make decision aids available to the operating personnel and to relief the latter of routing work as far as possible. Besides grid monitoring, it is necessary to react to disturbance situations that arise and to make control interventions in the grid events.

As an alternative, cloud computing platforms can be used for monitoring the air-core inductors. In this case, the data acquired are usually transmitted via a mobile radio network (3GPP mobile radio standards) to a corresponding cloud application and processed there. The data are provided via an APP (mobile and also as web page) made available for this purpose. In this case, the system only supplies information, warnings and alarms in the form of e.g. push messages to a cellular phone, but generally does not trigger switching actions and does not interact with a (closed) SCADA system.

To that end, important parameters of the air-core inductors are acquired by means of measuring devices, transferred to a central cloud-based database and conditioned and represented there in a manner suitable for operators.

Furthermore, from the parameters, by means of simulation methods, aging processes can be evaluated and potential failures can be identified at an early stage. Moreover, it is thereby possible to change over from periodic maintenance intervals to state-based maintenance.

In this regard, it is known, for example, that the service life of the winding of coils or transformers is primarily dependent on the state of the winding isolation, which experiences aging under the influence of the operating temperature.

To a good approximation, for solid isolations based on polymers the applicable law (Arrhenius) here stipulates that the service life of an isolation is shortened in each case by approximately half for a temperature increase of 10° C., relative to the hottest point.

Continuous monitoring of the temperature can therefore form the basis for determining the rate of aging or the remaining service life of the coil and enable timely disruption-free exchange.

Furthermore, corresponding control and regulating interventions in the grid enable the optimal loading of the component and thus enable the service life to be increased.

When the parameters are acquired by means of sensors in the case of components pertaining to high-voltage technology, the electrical and electromagnetic boundary conditions pose a particular challenge.

In this regard, for example, the smoothing inductors of high-voltage direct current transmission paths are at a high electrical potential with respect to ground, e.g. 500 to 800 kV, during operation.

Therefore, stringent requirements are made of the connection of the sensors fitted to the smoothing inductors, said sensors thus likewise being at a high electrical potential, to components that are at ground potential.

It is known, for example, to configure the connection to the sensors using fiber-optic cables both with regard to energy supply and for communication. In comparison with a galvanic connection line, the problem of reliable galvanic isolation between the lines of the sensor system and the heavy-current components is alleviated, but on account of possible contamination and moisture on the fiber-optic cables it is nevertheless still necessary to take measures for enlarging possible creepage paths, etc. These additional measures can cause an increased outlay for the production and cabling of the sensors and thus higher costs.

It is also conceivable to use radio sensors. Such radio sensors could be equipped with batteries having a long shelf life, such as lithium primary batteries, for example.

This can be used primarily for radio sensors which have to acquire and communicate measurement data only occasionally, rather than constantly, that is to say have a low energy demand on average. What can have a disadvantageous effect here, however, is that exchanging the batteries, even if at comparatively long time intervals, means a considerable maintenance outlay if e.g. they have to be exchanged in the case of smoothing inductors mounted on insulators having a length of up to 15 m. The sensors in the field of heavy-current engineering are often exposed to elevated ambient temperatures, as a result of which, in this field, a use of batteries is either not possible at all or possible only with frequent exchange.

SUMMARY OF THE INVENTION

The invention is therefore based on the object of specifying a simple and reliable method for temperature detection in the case of devices at high-voltage potentials (e.g. dry-insulated inductors).

This is achieved according to the invention by means of an air-core inductor as claimed.

Advantageous embodiments are evident from the dependent claims.

According to the invention, a thermographic sensor and means for contactless data transfer are secured to an air-core inductor and are supplied from the electromagnetic field of the coil by means of "energy harvesting" methods.

The term energy harvesting refers to obtaining small quantities of electrical energy from sources such as ambient temperature, vibrations or electromagnetic fields for mobile devices with low power.

The restrictions resulting from cable-based or optical-fiber-based power supply or batteries are thus avoided according to the invention.

A thermal imaging camera or an infrared array is preferably provided as the thermographic sensor.

Advantageously, the thermographic sensor is arranged on the top side of the air-core inductor and directed into the interior of the air-core inductor.

One advantageous embodiment of the means for obtaining electrical energy from the electromagnetic field comprises a coil, a rectifier element and a storage element.

The data transfer is expediently based on a radio network standard in accordance with IEEE-802.11 or else mobile radio standards in accordance with 3GPP.

If the temperature measurement system is linked into a SCADA system or a cloud-based database system, it is possible, on the basis of the infrared images determined, by means of suitable artificial intelligence methods, to identify critical operating states and to generate alarms or, by means of simulation, to determine an expected remaining service life of the air-core inductor and a proposal for an exchange date.

As a result, unplanned interruptions, service work or the failure of devices and installations can be reduced or avoided.

It is likewise advantageous if the data of the infrared images determined are inserted into a virtual, digital representation of the air-core inductor, i.e. into a so-called digital twin.

Digital twins enable a comprehensive data exchange. They are more than pure data and consist of models of the represented object and can additionally contain simulations, algorithms and services which describe properties or behaviors of the represented object or process, influence them, or offer services in respect thereof.

The invention is explained in greater detail on the basis of an exemplary embodiment illustrated in the FIGURE.

BRIEF DESCRIPTION OF THE FIGURES

The figure shows an air-core inductor and temperature measurement system according to the invention.

DETAILED DESCRIPTION OF THE INVENTION

The air-core inductor 1 illustrated by way of example in the FIGURE comprises, in a conventional manner, concentric winding layers electrically connected in parallel and spaced apart from one another by spacers, such that cooling air gaps are formed therebetween.

The winding layers are held together at their upper and lower ends by multi-arm spiders tensioned relative to one another by way of tensioning straps. The conductors of the winding layers are electrically connected to the spiders and the latter have connection lugs forming the connections of the air-core inductor 1.

The air-core inductor 1 is supported in a vertically standing position by way of insulators 2 and base securing elements with respect to ground. During operation, the air-core inductor is at a high electrical potential relative to ground, for example 500 to 800 kV, and carries a current of up to a few kiloamperes. The voltage drop across the air-core inductor 1, i.e. between the connections thereof, is small in comparison therewith and corresponds to the voltage drop as a result of the impedance at the respective frequency of the operating currents, generally a few kilovolts.

According to the invention, the alternating electromagnetic field that arises as a result is utilized, by means of coil, rectifier element and storage element, to ensure the electrical energy supply for a thermal imaging camera and a radio module on the basis of a radio network standard in accordance with IEEE-802.11 or a GSM network in accordance with 3GPP for contactless data transfer.

A permanent, maintenance-free and reliable supply is thus provided.

The thermal imaging camera is secured to a spider at the top side of the air-core inductor and is directed at the interior of the coil. It may be expedient to provide a plurality of thermal imaging cameras having different orientations.

For reliable measurement results it is necessary beforehand to determine the emissivities of the coil components and to avoid reflection of extraneous radiation.

If all disturbing influences are minimized, measurement accuracies or contrasts down to temperature differences of 0.1 K are possible.

As illustrated schematically in the FIGURE, the temperature measurement system is linked into a SCADA system 4 or a cloud-based database system and also serves as a basis for further data processing on the basis of cloud-based technologies known as the Internet of Things (IoT). A suitable IoT operating system for this purpose is, in particular, MindSphere from Siemens, but also AWS and Azure platforms, or the like, which makes it possible to utilize the wealth of data from the Internet of Things with comprehensive applications 5.

In this case, the physical air-core inductor is linked with a virtual representation, the "digital twin" 6, and the information determined by the temperature measurement system is acquired, combined with further relevant information and made available in the network.

The use and the utilization of the digital twin 6 entail a series of advantages.

It can serve for analyzing and evaluating operating data of the air-core inductor. It can alternatively be used as a design model of future inductors or for simulating the behavior, the functionality and the quality of the real air-core inductor 1 from any relevant standpoint.

This value can be utilized for all parts of the creation of value over the entire lifecycle.

The digital twin 6 can have various forms. It can be based on a behavior model of the system development, a 3D model or a function model, for example, which represents mechanical, electrical and other properties and performance features of the real coil in the course of a model-based configuration as realistically and comprehensively as possible.

The different digital twins 6 can be combined with one another and also allow extensive communication and interaction with the real coils. This is then referred to as a digital thread, which can run through the entire product lifecycle and include even further product-relevant information. Such a continuous digital thread actually provides a company with the greatest benefit. It allows optimization across various value creating processes and exploitation of the greatest range of possibilities for digital business models and services offered by way of products.

Through the combination of physics-based simulations with data analyses in a completely virtual environment, the digital twin leads to new findings. Since fewer real prototypes are necessary, innovations can be introduced more rapidly and more reliably.

LIST OF REFERENCE SIGNS

1 air-core inductor
2 insulators
3 top side of the air-core inductor
4 SCADA system or cloud-based system
5 applications
6 digital twin

The invention claimed is:

1. An air-core inductor with a temperature measurement system, comprising:
 a thermographic sensor being a thermal imaging camera;
 an energy harvesting device configured for obtaining electrical energy from the electromagnetic field;
 a transmitter configured for contactless data transfer; and
 the temperature measurement system being configured to analyze infrared images obtained by the thermal imaging camera using artificial intelligence or a simulation, or insert the data of infrared images obtained by the thermal imaging camera into a virtual, digital representation of the air-core inductor.

2. The air-core inductor according to claim 1, wherein said thermographic sensor is arranged on a top side of the air-core inductor.

3. The air-core inductor according to claim 1, wherein said energy harvesting device comprises a coil, a rectifier element, and a storage element.

4. The air-core inductor according to claim 1, wherein said transmitter is configured to operate according to a radio network standard in accordance with IEEE-802.11.

5. The air-core inductor according to claim 1, wherein said transmitter is configured to operate according to a mobile radio standard in accordance with 3GPP.

6. The air-core inductor according to claim 1, wherein the temperature measurement system is linked into a supervisory control and data acquisition ("SCADA") system.

7. The air-core inductor according to claim 1, wherein the temperature measurement system is linked into a cloud-based database system.

8. A method, comprising:
   providing an air-core inductor according to claim 1, wherein the thermographic sensor is a thermal imaging camera, and the transmitter is configured to operate according to a mobile radio standard in accordance with 3GPP;
   analyzing infrared images obtained by the thermal imaging camera using artificial intelligence;
   identifying critical operating states; and
   generating alarms.

9. A method, comprising:
   providing an air-core inductor according to claim 1, wherein the thermographic sensor is a thermal imaging camera, and the transmitter is configured to operate according to a mobile radio standard in accordance with 3GPP;
   analyzing infrared images obtained by the thermal imaging camera using a simulation; and
   determining an expected remaining service life of the air-core inductor and a proposal for an exchange date.

10. A method, comprising:
    providing an air-core inductor according to claim 1, wherein the thermographic sensor is a thermal imaging camera, and the transmitter is configured to operate according to a mobile radio standard in accordance with 3GPP;
    inserting the data of infrared images obtained by the thermal imaging camera into a virtual, digital representation of the air-core inductor.

* * * * *